United States Patent [19]

Colasent

[11] 4,209,877
[45] Jul. 1, 1980

[54] INSULATED SUPPLEMENTAL HANDLE HOUSING CAST IRON UTENSIL HANDLE

[76] Inventor: Julius R. Colasent, 123 Farland Pl., Escondido, Calif. 92025

[21] Appl. No.: 965,574

[22] Filed: Dec. 1, 1978

[51] Int. Cl.² ............................................. A47J 45/08
[52] U.S. Cl. .................... 16/116 R; 401/3; 2/20
[58] Field of Search ............ 16/116 R, 116 A, 114 A; 401/3; 2/20

[56] References Cited

U.S. PATENT DOCUMENTS

| | | | |
|---|---|---|---|
| 1,365,703 | 1/1921 | Kolb | 16/116 R |
| 1,512,197 | 10/1924 | Borel | 16/116 R |
| 1,942,493 | 1/1934 | Reith | 16/116 R |
| 1,965,354 | 7/1934 | Patock | 16/116 R |
| 2,231,222 | 2/1941 | Rosenheimer, Jr. | 16/116 R |
| 2,457,898 | 1/1949 | Hummel | 16/116 R |
| 2,511,786 | 6/1950 | Patti | 16/116 R |
| 2,609,563 | 9/1952 | Budelman | 16/116 R |
| 2,635,280 | 4/1953 | Baca | 16/116 |

FOREIGN PATENT DOCUMENTS 571926  9/1945  United Kingdom .................. 16/116 R

*Primary Examiner*—Andrew V. Kundrat
*Attorney, Agent, or Firm*—Duane C. Bowen

[57] ABSTRACT

The combination with a cast iron cooking utensil of the type having an integral handle extending radially therefrom, of a two-part insulating housing enclosing the handle to achieve lower temperatures for manual handling. The hollow housing, with inner walls spaced from the handle, is made of low heat-transferring material. The handle is secured in place in the housing by a pair of locking plates, at the inboard end of the housing, with paired jaws gripping the handle, and by a medial key with a necked center engaged in the slot in the handle, which slot is elongated longitudinally of the handle. The locking plates extend between upper and lower housing parts and countersunk bolts tense the jaws on the handle. A plate in the outboard portion of the housing holds the parts apart, which are secured to the plate by countersunk fasteners. A baffle, depending from the inboard end of the housing, directs heat away from the housing.

8 Claims, 8 Drawing Figures

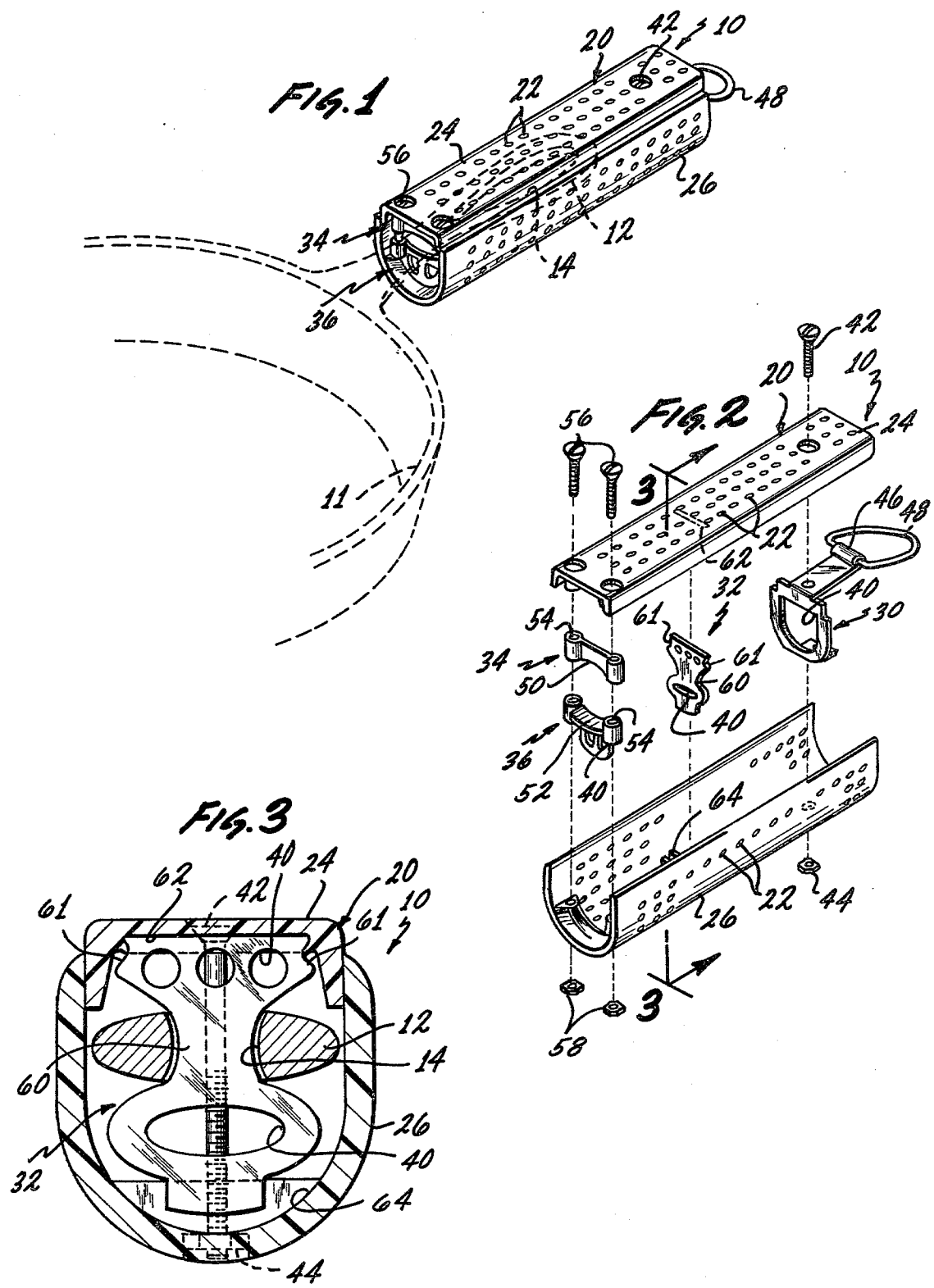

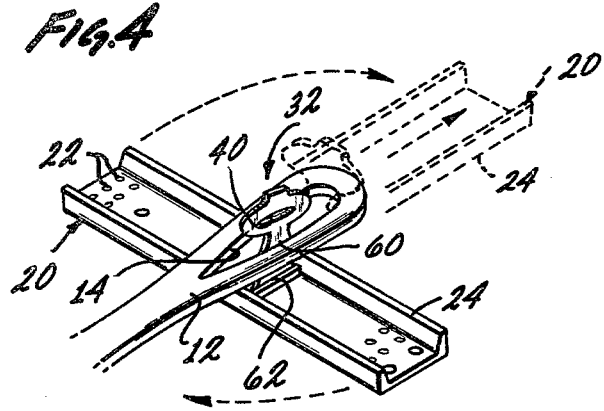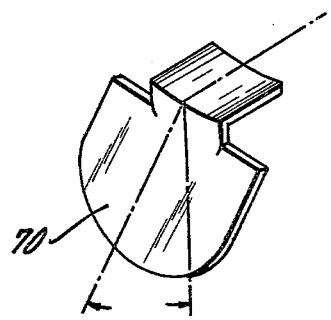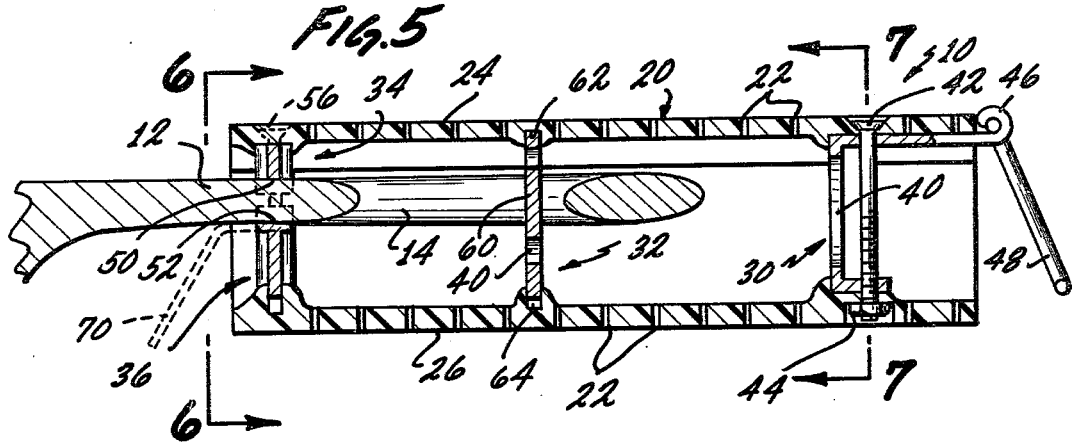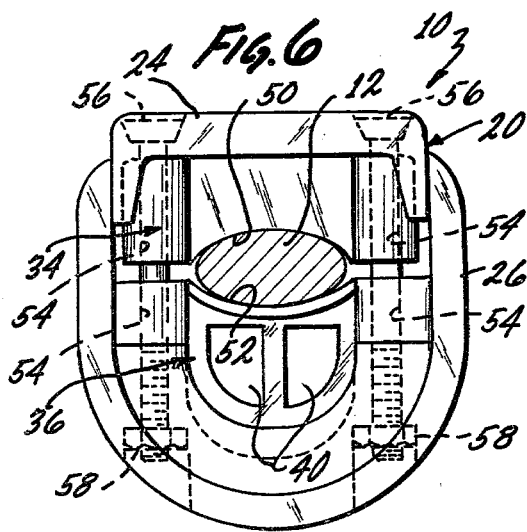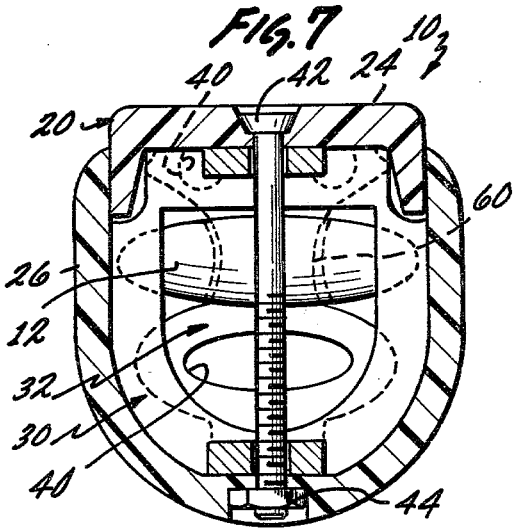

INSULATED SUPPLEMENTAL HANDLE HOUSING CAST IRON UTENSIL HANDLE

CONCISE SUMMARY OF INVENTION AND OBJECTIVES

My invention relates to means to insulate a cast iron utensil handle for manual handling.

Until now cast iron cookware, when reaching elevated temperatures during use, could be comfortably handled only by the application of protective aids such as pot holders, insulated mits, etc. After a short cooking time at usual temperatures, the handle becomes very hot and the shortness of the handle also makes it very difficult to move or pick up the cookware. Objectives of my invention include being able to handle cookware comfortably and avoiding the possibilities of starting fires with the use of soiled or greasy pot holders, mits, towels, etc.

An old problem is the high temperatures of integral handles of cast iron cooking utensils. It appears that a satisfactory solution to that problem has not been devised until now and it is my objective to provide a supplemental insulating handle solving the problem of high temperatures.

Additionally, my objectives include: to provide such a supplemental handle of low heat-transferring material; to perforate such handle for cooling by convection; to adequately secure the cast iron handle against wobble or inadvertent release; and, at least equally importantly, to devise a supplemental handle entirely practical from the view point of economical manufacture.

In order to solve the problem of providing an auxiliary handle that can be manually grasped, without lifters, for the handle of a cast iron utensil, the design must take carefully into account the various ways heat is transferred and dispersed, i.e., radiation, conduction and convection, and it is an additional objective of my invention to carefully design such auxiliary handle with due regard to heat transfer by radiation, conductor and convection. A further objective of my invention is to provide such a supplemental handle that does not require redesign of the substantially standard cast iron cookware handle as to future production and will also fit such cookware of past production.

A preliminary examination search was conducted on this invention and the following listed patents, on items with which I was not familiar, were located:

| | |
| --- | --- |
| 1,512,197 | 2,231,222 |
| 2,609,563 | 2,457,898 |
| 2,511,786 | 2,635,280 |
| 1,942,493 | 1,365,703 |

Although the patents generally concern the problem of handles for cookware, their solutions seems to be distinctly different from each other and from the present invention.

My invention will be best understood, together with additional objectives and advantages thereof, from the following description, read with reference to the drawings in which:

DRAWINGS

FIG. 1 is a perspective view of a supplemental handle which is a specific embodiment of my invention. A typical cast iron fry pan, having a conventional integrally cast handle, is shown in past in dashed lines.

FIG. 2 is a perspective view of parts of my handle in exploded disposition to better illustrate their structures and how they are assembled.

FIG. 3 is a view on enlarged scale and partly in section taken of an assembled handle in the plane indicated by the line 3—3 of FIG. 2.

FIG. 4 is a partial perspective view showing the cast iron pan handle inverted and having engaged in its opening a key which is secured to the upper inverted part of my handle housing. In dashed lines is illustrated the pivoting of that housing part to disposition aligned with the pan handle thereby locking the key to the cast iron handle.

FIG. 5 is an enlarged elevational view, partly in section, longitudinally through the cast iron handle and my supplemental handle. The dashed lines show an optional baffle.

FIG. 6 is like FIG. 3 only is taken on line 6—6 of FIG. 5.

FIG. 7 is like FIG. 3 only is taken on line 7—7 of FIG. 5.

FIG. 8 is a perspective view of the optional baffle. The dashed lines, showing axes, illustrate the angling of the baffle.

DESCRIPTION

My supplemental handle 10 was designed to lock onto various sized cast iron cookware, such as skillets and fry pans, with eyelet type handles. It can also be sized or adapted for other cookware. The handle can be put on at the time of manufacture or can be sold as a separate item and attached by the consumer. The unique design of the handle makes assembly and installation fast and easy. When the handle is attached correctly and the cookware is used properly, the need for other protection, such as pot holders, could be eliminated. The simple design keeps the amount of labor and materials used to build the handle at a minimum, therefore making it a very saleable item.

All materials used to build my handle must be strong enough to withstand normal cooking use. The three inner plate-like members should be made of strong heat-resisting material. The strong points are these three inner plates standing on end which allows them to hold the handle firmly in place. The perforated top and bottom pieces of the handle should be made of fireproof and low heat-transferring material. The optional lower handle heat guard should be made of a fireproof and soft material that will hold its form. The fasteners for the handle are optional and countersunk to prevent hot spots. If the proper materials are used in manufacturing the handle, this air cooled handle 10, correctly installed and used, will greatly improve the use of cookware to which it can be applied.

To more specifically describe my invention, supplemental handle 10 is primarily adapted to be used with cast iron cooking ware 11 such as a griddle or a frying pan having cast integral therewith and extending radially therefrom a cast iron handle 12. These cast iron utensils have been sold for many years and may be enjoying a rebirth of popularity in recent years. Such cast iron utensils seem to have become quite standardized, at least as to handles 12, so that the handles are much the same, within surprisingly similar tolerances from various sources. Those skilled in the art will understand from my disclosures that my construction in one size will fit most cast iron utensil handles found in United States households or on the market in the country. The close similarities include the slot 14 extending vertically through handle 12, the slot being elongated longitudinally of handle 12 and tapering to each end in convexo-convex shape. The external surfaces of handle 12 are somewhat symmetrical or similar to the contour of eyelet or slot 14 and taper inboard and outboard. I dwell on these features because they are accommodated or utilized in adequately securing an insulating handle 10 to cast iron handle 12. Such cast iron cookware 11 is excellent for cooking certain types of items but suffers the disadvantage that handle 12 reaches a relatively high temperature relative to the temperature of the remainder of utensil 11, as cast iron is a fair conductor of heat and the distance from handle 12 to the areas of applied heat on utensil 11 is relatively short.

It is important to make the surfaces of hollow handle housing 20 to be contacted by the hand of low heat-transferring material, such as certain plastics common to handles or knobs for cookware and the like on the market that are subjected to rather high temperatures. Such plastics have the ability to stand such temperatures without excessive deterioration. Any metal fasteners used should be countersunk relative to the surface of housing 20. Note that housing 20 involves certain aspects of favorable handling of heat transfer, meaning low conduction to the external surfaces of any heat reaching housing 20, wiping housing surfaces with air to cool the same, etc. If housing 20 also has perforations 22, air convection through perforations 22 will tend to cool areas touched by hand.

Housing 20 has upper and lower separable shell members 24, 26. Upper shell member 24 telescopes into lower shell member 26 as part of adjustability for differences in thicknesses of cast iron handles 12.

Three structural elements extend between upper and lower shell members 24, 26. The outboard structural element is a clip 30, the medial structural element is a key 32, and the inboard structural element consists of upper and lower locking members 34, 36. These members are structural in that much of the strength of handle 10 is dependent on them, in that they will be made of metal or possibly other strong material, and in that the portions of supplemental handle 10 directly engaging cast iron handle 12 are key 32 and locking members 34, 36. It will be apparent that all elements shown as making up handle 10 are well selected and designed for economical manufacture. For examples, all or part of members 30, 32, 34, 36 can be formed by punching out of sheet metal, and by bending and/or by progressively forming in dies. On the other hand, I do not mean to eliminate the possibility of forming one or more of these elements by other manufacturing methods, such as casting. I recognize that any particular manufacturer, learning of the present disclosure and progressing to production of my handle, may see fit to variously modify the details of my handle 10, modify the dimensions, and modify part designs according to intended methods of production and according to strength and cost considerations. Note that the parts are shown as having portions 40 punched out or otherwise similarly formed for various reasons including providing better cooling air circulation throuth handle 10.

Clip 30 can be considered to form a pivot of sorts for upper and lower shell members 24, 26, which at the inboard end are adjustably spaced as locking members 34, 36 engage cast iron handles 12 of somewhat different thicknesses (probably not over about 1/16" differences in thicknesses in most cast iron handles 12). Some generosity in manufacturing tolerances permit clip 30 to accommodate such small pivotal adjustment without provision of some classical form of pivot. To restate, shell members 24, 26 have spacing at their outboard end determined by the dimensions of clip 30 whereas shell members 24, 26 have spacing at their inboard ends determined by the abutment of locking members 34, 36 to cast iron handle 12. Clip 30, which generally fits the inside contour of housing 20, is appropriately secured. The securement shown is a single bolt 42 extending through the assembly and engaged by a nut 44, both the bolt head and the nut being countersunk in the respective surfaces of shell members 24, 26. The upper portion of clip 30 may be extended to form a pivotal connection 46 with a loop 48 for hanging of cast iron utensil 11. If such loop 48 is provided, the extended upper clip portion may be further secured with a pivot.

The opposed jaws 50, 52 of locking members 34, 36 are concave laterally of cast iron handle 12 to somewhat match contours of jaws and handle. The common variations in thickness of cast iron handles 12 may be on the order of 1/16" and the affected parts of supplemental handle 10 should be designed to accommodate at least that range of sizes. Members 34, 36 have end bosses with passageways 54 for fasteners which are shown to have the form of bolts 56 and nuts 58 countersunk in housing 20. In installing supplemental handle 10 on cast iron handle 12, bolts 56 are tightened until handle 12 is firmly clamped between jaws 50, 52.

The other securement of cast iron handle 12, in addition to clamping of jaws 50, 52, is the engagement of key 32 in eyelet or slot 14 of handle 12. The sequence is, first, the engagement of key 32 in eyelet 14 and, second, the clamping by jaws 50, 52. Key 32 is medially necked at 60 and the width of the neck must be no greater than the maximum width of eyelet 14 in the smallest eyelets found in cast iron utensils of common manufacture. That is just to say that the eyelet must provide enough room for the width of neck 60. This means that neck 60 will be too narrow for the broadest part of larger size eyelets in the common range and, after engagement in eyelet 14, housing section 24 is moved the maximum distance outboard of cast iron handle 12, as demonstrated in FIG. 4, to firmly engage key 32 with the edges of eyelet or slot 14 before handle 12 is clamped by jaws 50, 52.

As shown, the top and bottom of key 32 is received in slots 62, 64 in housing shell sections 24, 26. If the key is molded in place in top shell member 24, it can have vee notches 61 securing the key, but such notches 61 are not used if the key 32 fits in a premolded slot 62. FIG. 4 shows the method of engaging key 32 in eyelet 14 in which utensil handle 12 is inverted and key 32 engaged in slot 62 of housing section 24 (also inverted) is inserted into eyelet 14 by turning housing section 24 crosswise of handle 12 (full lines of FIG. 4). Then housing section 24 is pivoted into alignment with handle 12 and moved outboard until the walls of eyelet 14 are firmly engaged in neck 60. If key 32 were of pivotal construction itself, then of course the procedure of FIG. 4 would not be needed to get key 32 installed in eyelet 14. Note that the interior surface of housing 20 is contoured to variously fit or seat members 30, 32, 34, 36.

An angled baffle 70 may be sandwiched with handle 12 between jaws 50, 52, as illustrated in FIGS. 5 and 8, to help direct heat away from housing 20.

From the foregoing, it should be apparent that I have provided a supplemental handle 10 which not only is functional for its purposes but is also sophisticated as to manufacturing and cost considerations, to meet the demands of the market for the device.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. The combination with a cast iron cooking utensil of the type having cast integrally therewith a handle extending radially outwardly therefrom, said handle being of the type having extending vertically therethrough an opening, of means to insulate said handle for manual handling, comprising:
   (a) a hollow housing receiving at least the outboard portion of said handle and housing the same, said housing being formed of low heat transferring material,
   (b) an upright key disposed in said hollow housing and secured thereto and said key being disposed in said opening and engaging the sides of said opening, said key being formed of sheet material and being planar and lying in an upright plane extending laterally of said handle and said key extending vertically from above said opening to below said opening, and
   (c) a pair of locking members secured in the inboard portion of said housing and having opposed jaws engaging opposite portions of said handle, and means tensing said jaws to grip said handle, whereby the one portion of said housing is secured to said handle by said key and an inboard portion of said housing is secured to said handle by said locking members.

2. The subject matter of claim 1 in which the inner walls of said hollow housing are spaced from said handle by means including said key and by said locking members, which are made of metal, said means tensing said jaws being threaded bolt means, said locking members being arranged in an upper and lower pair and said jaws engaging top and bottom of said handle, said key being disposed medially of said housing, said opening in said handle being a slot elongated longitudinally of said handle and tapering to each end and the external surfaces of said handle also tapering inboard and outboard.

3. The combination with a cast iron cooking utensil of the type having cast integrally therewith a handle extending radially outwardly therefrom, said handle being of the type having extending vertically therethrough an opening, of means to insulate said handle for manual handling, comprising:
   (a) a hollow housing receiving at least the outboard portion of said handle and housing the same, said housing being formed of low heat transferring material,
   (b) an upright key disposed in said hollow housing and secured thereto and said key being disposed in said opening and engaging the sides of said opening,
   (c) a pair of locking members secured in the inboard portion of said housing and having opposed jaws engaging opposite portions of said handle, and means tensing said jaws to grip said handle, whereby the one portion of said housing is secured to said handle by said key and an inboard portion of said housing is secured to said handle by said locking members,
   (d) the inner walls of said hollow housing being spaced from said handle by means including said key and by said locking members, which are made of metal, said means tensing said jaws being threaded bolt means, said locking members being arranged in an upper and lower pair and said jaws engaging top and bottom of said handle, said key being disposed medially of said housing, said opening in said handle being a slot elongated longitudinally of said handle and tapering to each end and the external surfaces of said handle also tapering inboard and outboard, and
   (e) said key having a necked middle which is the portion of said key engaging the sides of said slot.

4. The subject matter of claim 3 in which said housing is formed by upper and lower separable shell members, the upper portion telescoping into the lower portion to adjust to handle thickness, said key being secured to one shell member and the other shell member having a slot into which said key is fitted, said key fitting through said slot by disposing said handle lateral of said housing.

5. The subject matter of claim 4 in which said shell members at the outboard end of said housing are secured together in spaced relation by a clip fitting the housing hollow cross-section and secured to said housing by countersunk fasteners.

6. The subject matter of claim 5 in which said clip has pivotally connected thereto a loop for hanging of said utensil.

7. The subject matter of claim 3 in which said locking members have rolled lateral edges forming passages through which said bolt means extend.

8. The combination with a cast iron cooking utensil of the type having cast integrally therewith a handle extending radially outwardly therefrom, said handle being of the type having extending vertically therethrough an opening, of means to insulate said handle for manual handling, comprising:
   (a) a hollow housing receiving at least the outboard portion of said handle and housing the same, said housing being formed of low heat transferring material,
   (b) an upright key disposed in said hollow housing and secured thereto and said key being disposed in said opening and engaging the sides of said opening,
   (c) a pair of locking members secured in the inboard portion of said housing and having opposed jaws engaging opposite portions of said handle, and means tensing said jaws to grip said handle, whereby the one portion of said housing is secured to said handle by said key and an inboard portion of said housing is secured to said handle by said locking members,
   (d) the inner walls of said hollow housing being spaced from said handle by means including said key and by said locking members, which are made of metal, said means tensing said jaws being threaded bolt means, said locking members being arranged in an upper and lower pair and said jaws engaging top and bottom of said handle, said key being disposed medially of said housing, said opening in said handle being a slot elongated longitudinally of said handle and tapering to each end and the external surfaces of said handle also tapering inboard and outboard, and
   (e) a heat guard extending from between said handle and the jaw of said lower locking member away from said housing and down as a heat baffle to direct heat away from said handle.

* * * * *